United States Patent Office 2,758,970
Patented Aug. 14, 1956

2,758,970

DERIVATIVES OF ROSIN AMINES

Albert J. Saukaitis, Wayne, and George S. Gardner, Elkins Park, Pa., assignors to American Chemical Paint Company, Ambler, Pa., a corporation of Delaware No Drawing. Application June 10, 1953,
Serial No. 360,814

14 Claims. (Cl. 252—8.55)

This invention relates to new chemical compounds which may be described as derivatives of rosin amines. They are represented by the formula

where R is a radical selected from the group consisting of abietyl, hydroabietyl and dehydroabietyl, Y is the group $CH_2.R_1$, X is a radical selected from the group consisting of hydrogen and $CH_2.R_1$, and $R_1$ represents alpha ketonyl groups.

The compounds which we have developed have been found to be exceptionally strong, long-lived corrosion inhibitors and are of particular value as inhibitors in acid mediums or baths for the prevention or retardation of the attack of such baths upon metal surfaces and especially upon steel surfaces.

The principal objects of our invention are to provide new chemical compounds of the character described which are especially useful as inhibitors of acid corrosion when used in acid baths which are maintained at ordinary room or living temperatures or at temperatures higher than average room or living temperatures; to provide compounds which are particularly efficient when used with hydrochloric acid in oil-well acidizing; to provide such compounds which can be prepared in a simple manner from easily obtainable low cost raw materials; to provide compounds of the character described which have an unusually high degree of heat stability, the compounds of the present invention having been found to be very effective as inhibitors even up to temperatures as high as 150° C.; and, in general, to improve the usefulness and lower the cost of inhibiting materials for a wide variety of industrial operations. For example, we have found that the materials of our invention are highly useful for the protection of metals generally and particularly for the protection of ferriferous metals during the removal of water-borne deposits, of heat scale and of rust where the removal is carried out by means of acid salts or acids such as hydrochloric, sulfuric, acetic, formic and the like. Our invention results in the conservation of large quantities of metals as well as of acids.

The materials of our invention may be prepared by reacting rosin amine, formaldehyde and a ketone. The term rosin amine as used herein designates those primary amines which are made from rosins or rosin amines and they may be considered as broadly including compounds containing the abietyl, hydroabietyl and dehydroabietyl radicals. Furthermore, the term is to be considered as covering primary amines derived from rosin and rosin acids whether or not modified by hydrogenation or dehydrogenation.

Examples of ketones which are suitable for use in the preparation of our improved compounds are the following:

| | |
|---|---|
| Acetone | Isophorone |
| Methyl ethyl ketone | Mesityl oxide |
| Diacetone alcohol | Cyclopentanone |
| Pentane dione, 2,4 | Cyclohexanone |
| Acetonyl acetone | Acetophenone |

In general, ketones of a like nature are all useful as materials from which our improved compounds may be prepared.

A convenient method for effecting the reaction required to produce our novel materials is as follows: One mole of rosin amine is reacted with one to four moles of an appropriate ketone plus one to four moles of formaldehyde. Generally, the rosin amine is dissolved in the appropriate ketone after which from one to four moles of 37% aqueous formaldehyde solution is added with stirring. We prefer to bring about the reaction of this mixture in an acid medium and to this end one mole of concentrated hydrochloric acid is added with stirring under reflux conditions. The mixture is then allowed to reflux for a period varying between one and twenty-four hours. At the end of the reflux period, if a volatile ketone has been used, any excess ketone is distilled off. On the other hand, if a ketone having a high boiling point has been used, the quantity of ketone added may be conveniently limited to that which is consumed in the reaction so that no distillation of ketone is necessary at the end of the reflux period.

The reaction mixture, when prepared as above described, will contain the compounds of the present invention in the form of their hydrochlorides and these compounds may be used as inhibiting materials without further purification or modification. Quite often the reaction product is soluble in water or mineral acid but if not so soluble it may be formulated into useful inhibitor compositions either by means of appropriate solvents such as alcohol or by means of dispersing agents or in other ways known to the art.

We have found that certain modifications of the above general procedure may be adopted if desired. For instance, acids other than hydrochloric acid may be used as, for example, hydrobromic acid, acetic acid or sulfuric acid. In place of water other suitable solvents such as alcohol may be employed and paraformaldehyde may be used instead of the aqueous solution of formaldehyde referred to.

With the understanding that "R" is a radical selected from the group consisting of abietyl, hydroabietyl and dehydroabietyl, formation of the compounds of the present invention may be illustrated by the following reactions:

(1)
$R.NH_2.HCl + HCHO + CH_3.CO.CH_3 \longrightarrow$
$R.NH.CH_2CH_2.CO.CH_3.HCl$ (2)
$R.NH_2.HCl + 2HCHO + 2CH_3.CO.CH_3 \longrightarrow$

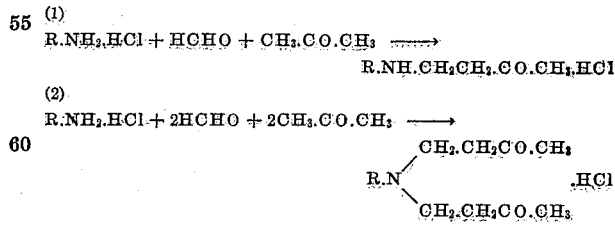

In these reactions, acetone has been used as an example of a ketone. Other ketones may be used. If, for example, cyclohexanone had been used in Equation 1 instead of acetone, the alpha-ketonyl group which appears above would be alpha-cyclohexanonyl:

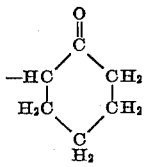

instead of acetonyl:

—CH₂.CO.CH₃

Thus, it may be said that the compounds of the present invention may be summarized in terms of the general formula given at the beginning of this specification. These compounds are secondary or tertiary amines and show the characteristic properties of such compounds. For example, they form salts with acids and, as previously indicated, are conveniently used in the form of acid salts.

As has been stated, the compounds of the present invention are useful by themselves as inhibitors. However, it is quite customary in this art at times, if desirable, to prepare inhibitor formulations which make use of more than just one ingredient. Our compositions lend themselves exceptionally well to such formulations. For instance, they may be admixed with soluble copper salts, thiourea, etc.

Example 1

In a round-bottom Pyrex flask is placed 217 grams of a commercial grade of dehydrogenated rosin amine (approximately 0.70 mole). Four moles (293 ml.) of acetone are added, and 2.2 moles (163 ml.) of 37% solution of formaldehyde. The mixture is stirred slowly with a mechanical stirrer, and 0.70 mole (70 ml.) of 20° Bé. hydrochloric acid is added in small increments over a period of 10 minutes. The mixture is refluxed gently for 15 hours. At the end of this time, the liquid is distilled to a vapor temperature of 90° C., 200 ml. of distillate being obtained. The distillate contains the excess acetone plus some water and formaldehyde. The residue in the flask consists principally of a solution of:

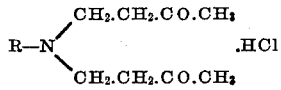

which is a dark, oily, viscous material. The material may be used without further modification. However, we have found it useful to dilute it with water in order to prepare a rather low viscosity inhibitor formulation. Consequently, the inhibitor formulation of Example 1 is obtained by diluting the product just prepared with water to make up a total weight of 620 grams. This solution is well mixed and is now ready for use as an inhibitor.

Example 2

Proceed according to the instructions contained in Example 1 but add to the final inhibiting product an equal volume of a copper chloride solution of 7.5 grams of copper chloride in 100 ml. of water.

Example 3

In a Pyrex flask is placed 315 grams of a commercial mixture of rosin amine, the major constituent of which is dehydroabietylamine, the remaining portion being dihydro and tetrahydroabietylamine. 2.00 moles of acetone and 2.5 moles of aqueous formaldehyde are added. The mixture is stirred slowly with a mechanical stirrer, and 1.0 mole (100 ml.) of 20° Bé. hydrochloric acid is added slowly. The mixture is boiled gently under reflux for 24 hours. This material has a composition consisting principally of:

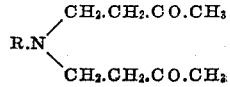

At the end of 24 hours reflux period, sufficient water is added to make up a total weight of 900 grams and this represents the completed corrosion inhibitor formulation of Example 3.

Example 4

100 grams of pentanedione 2,4, 217 grams of commercial grade of rosin amine, 92 ml. of 37% formaldehyde solution, and 100 ml. of 20° hydrochloric acid are mixed in a reaction flask. The solution is refluxed for one hour, during which two layers are formed. The mixture is poured into a separatory funnel and the dark, viscous, liquid which forms the bottom layer is separated from the supernatant aqueous layer. The product is largely soluble in water, although it has already been separated from an aqueous layer. The product is the corrosion inhibitor, and can be blended into formulations containing wetting agents, alcohols, or other appropriate solvents.

Example 5

196 grams of mesityl oxide, 217 grams of commercial grade of rosin amine, and 163 ml. of 37% aqueous formaldehyde solution are placed in a reaction flask. 100 ml. of 20° hydrochloric acid is added, slowly. The mixture is refluxed 2 hours. The mixture, now consisting of two layers, is allowed to settle two days. The lower layer is separated. This is the corrosion inhibitor.

Example 6

217 grams of commercial grade of rosin amine, 232 grams of diacetone alcohol, 163 ml. of aqueous formaldehyde solution, 37% by weight, and 100 ml. of 20° hydrochloric acid solution are mixed in a reaction flask. At the beginning of the reaction the mixture is homogeneous. After refluxing 15 hours the mixture separates into two layers. The lower, oily layer is separated. This is the corrosion inhibitor.

Example 7

217 grams of a commercial mixture of rosin amines, the major constituent of which is dehydroabietylamine, is dissolved in 144 g. (2.0 moles) of methyl ethyl ketone. Hydrobromic acid (Sp. Gr. 1.5), 135 grams, is added slowly, with stirring. The solution is refluxed gently, and 75 grams of paraformaldehyde are added slowly, over a period of three hours. 100 ml. of a suitable solvent such as isopropanol is added, and the solution is then refluxed over night. The finished solution weighed 650 grams. This is the corrosion inhibitor.

In order to evaluate the compounds of the present invention as commercial inhibitors, a solution of 150 mls. of 10° Bé. hydrochloric acid was placed in a Pyrex test tube (1½"×8") and 0.5% by volume of the inhibitor was suspended or dissolved therein. The test tube and contents were immersed in a thermostatic bath maintained at 180° F. After the contents of the tube reached 180° F., a piece of descaled hot rolled steel strip ½"×10"×0.03") was folded in half and placed in the solution. The tube was then immediately connected to a device by means of which the evolved hydrogen could be collected and measured. The volume of hydrogen collected was corrected to 0° C. and 760 mm. pressure. The volume of hydrogen evolved in three hours is the figure used in calculating the strength rating. The strength rating is given by the formula:

$$\frac{5100}{\text{Volume of hydrogen collected in three hours}}$$

Three strong commercial inhibitors recommended for use in oil-well acidizing and having ratings of 5.7, 9.9 and 21 respectively were taken as standards of comparison. The "strength ratings" of the inhibitor formulations of Examples 1 through 7 just given are as follows:

100, 204[1], 88, 85, 64, 44 and 127. From this it may be seen that the compounds of the present invention have exceptional inhibiting value.

The comparisons just given were made in such a way as to simulate oil-well acidizing conditions as closely as possible in the laboratory in an effort to give a practical evaluation of the usefulness of the compounds of the present invention.

It is difficult to specify the exact amount of the compounds of the present invention to be used to inhibit the attack of corrosive fluids upon metals. At times as little as 0.01% by weight may be needed. At other times it may be more or less, depending on the job to be done. Suffice it to say, enough material to accomplish the desired result is a matter which may be determined by means of simple test in various ways familiar to the art.

While the detailed description of the invention has been made with specific emphasis on its utility with ferriferous metal surfaces, it should be emphasized that the inhibitors are not limited to use with steel. For instance, the materials are useful in reducing the rate of corrosion of metals such as magnesium, aluminum and zinc when they are exposed to the action of a corrosive material such as hydrochloric acid.

We claim:

1. As a new material, a chemical compound represented by the formula

where R is a radical selected from the group consisting of abietyl, hydroabietyl and dehydroabietyl, Y is the group $CH_2.R$, X is a radical selected from the group consisting of hydrogen and $CH_2.R_1$, and $R_1$ represents alpha ketonyl groups.

2. As a new material, the product formed by the reaction, in the presence of acid, between rosin amine, a ketone having a reactive hydrogen atom adjacent to the carbonyl group and formaldehyde.

3. As a new material, the product formed by the reaction, in the presence of acid, between rosin amine, a ketone having a reactive hydrogen atom adjacent to the carbonyl group and formaldehyde in a molar ratio of approximately 1 rosin amine, 1 to 4 ketone and 1 to 4 formaldehyde.

4. The method of making an inhibitor which comprises reacting, in the presence of acid, a mixture of a rosin amine, a ketone having a reactive hydrogen atom adjacent to the carbonyl group and formaldehyde.

5. The method of claim 4 wherein the mixture contains 1 mole of the rosin amine to 1 to 4 moles each of the ketone and the formaldehyde.

6. The method of claim 4 in which the acid is hydrochloric acid.

7. The method of claim 4 in which the acid is chosen from the group consisting of hydrochloric, hydrobromic, acetic and sulfuric acids.

8. The method of making an inhibitor comprising admixing under reactive conditions in the following proportions 1 mole of rosin amine with 1 to 4 moles of a ketone having a reactive hydrogen atom adjacent to the carbonyl group and 1 to 4 moles of formaldehyde in an aqueous solution which contains at least 1 mole of hydrochloric acid.

9. The method of claim 8 in which the reaction takes place under reflux conditions and over a period of approximately 1 to 24 hours.

10. The method of making an inhibitor which comprises preparing a solution of 1 mole of rosin amine and from 1 to 4 moles of ketone from the group consisting of:

| Acetone | Isophorone |
|---|---|
| Methyl ethyl ketone | Mesityl oxide |
| Diacetone alcohol | Cyclopentanone |
| Pentane dione, 2, 4 | Cyclohexanone |
| Acetonyl acetone | Acetophenone | adding to the solution from 1 to 4 moles of an aqueous formaldehyde solution accompanied with stirring, adding with stirring approximately 1 mole of hydrochloric acid, refluxing the mixture for from 1 to 24 hours and distilling off any volatile ketone which may be present.

11. The method of making an inhibitor which comprises preparing a solution of 1 mole of rosin amine and from 1 to 4 moles of ketone from the group consisting of:

| Acetone | Isophorone |
|---|---|
| Methyl ethyl ketone | Mesityl oxide |
| Diacetone alcohol | Cyclopentanone |
| Pentane dione, 2,4 | Cyclohexanone |
| Acetonyl acetone | Acetophenone | adding to the solution from 1 to 4 moles of an aqueous formaldehyde solution accompanied with stirring, adding with stirring approximately 1 mole of hydrochloric acid, refluxing the mixture for from 1 to 24 hours, and separating the lighter aqueous portion to leave a residue of inhibiting material.

12. The method of making an inhibitor which comprises reacting a mixture of rosin amine, a ketone and formaldehyde, the reaction taking place in an aqueous acid solution chosen from the group consisting of hydrochloric, hydrobromic, acetic and sulfuric acids and the ketone being chosen from the group consisting of:

| Acetone | Isophorone |
|---|---|
| Methyl ethyl ketone | Mesityl oxide |
| Diacetone alcohol | Cyclopentanone |
| Pentane dione, 2,4 | Cyclohexanone |
| Acetonyl acetone | Acetophenone |

13. The method of controlling metal corrosion caused by an acidic medium which consists in adding to the medium a quantity of a compound having the formula

where R is a radical selected from the group consisting of abietyl, hydroabietyl and dehydroabietyl, Y is the group $CH_2.R_1$, X is a radical selected from the group consisting of hydrogen and $CH_2.R_1$, and $R_1$ represents alpha ketonyl groups, the quantity added being sufficient to materially reduce the rate of corrosion.

14. An aqueous acidic treating solution containing a compound having the following formula

where R is a radical selected from the group consisting of abietyl, hydroabietyl and dehydroabietyl, Y is the group $CH_2.R_1$, X is a radical selected from the group consisting of hydrogen and $CH_2.R_1$, and $R_1$ represents alpha ketonyl groups, the quantity of which compound present being sufficient to materially reduce the corrosive attack of the solution on metal.

References Cited in the file of this patent

UNITED STATES PATENTS

| 1,877,504 | Grebe et al. | Sept. 13, 1932 |
| 2,489,668 | Plati | Nov. 29, 1949 |
| 2,511,064 | Ingram | June 13, 1950 |
| 2,564,759 | Haggard | Aug. 21, 1951 |
| 2,649,415 | Sundberg et al. | Aug. 18, 1953 |

---

[1] In this test the acid solution contained in addition to 0.5% by volume of the formulation of Example 1, 0.0375% wt./vol. copper chloride.